3,209,748
RECIPROCATING HEART RESUSCITATOR DEVICE HAVING FLUID PRESSURE CONTROL APPARATUS
Eugene P. Thomas, Baltimore, Md., assignor to Westinghouse Electric Corporation, Pittsburgh, Pa., a corporation of Pennsylvania
Filed Apr. 19, 1963, Ser. No. 274,092
6 Claims. (Cl. 128—53)

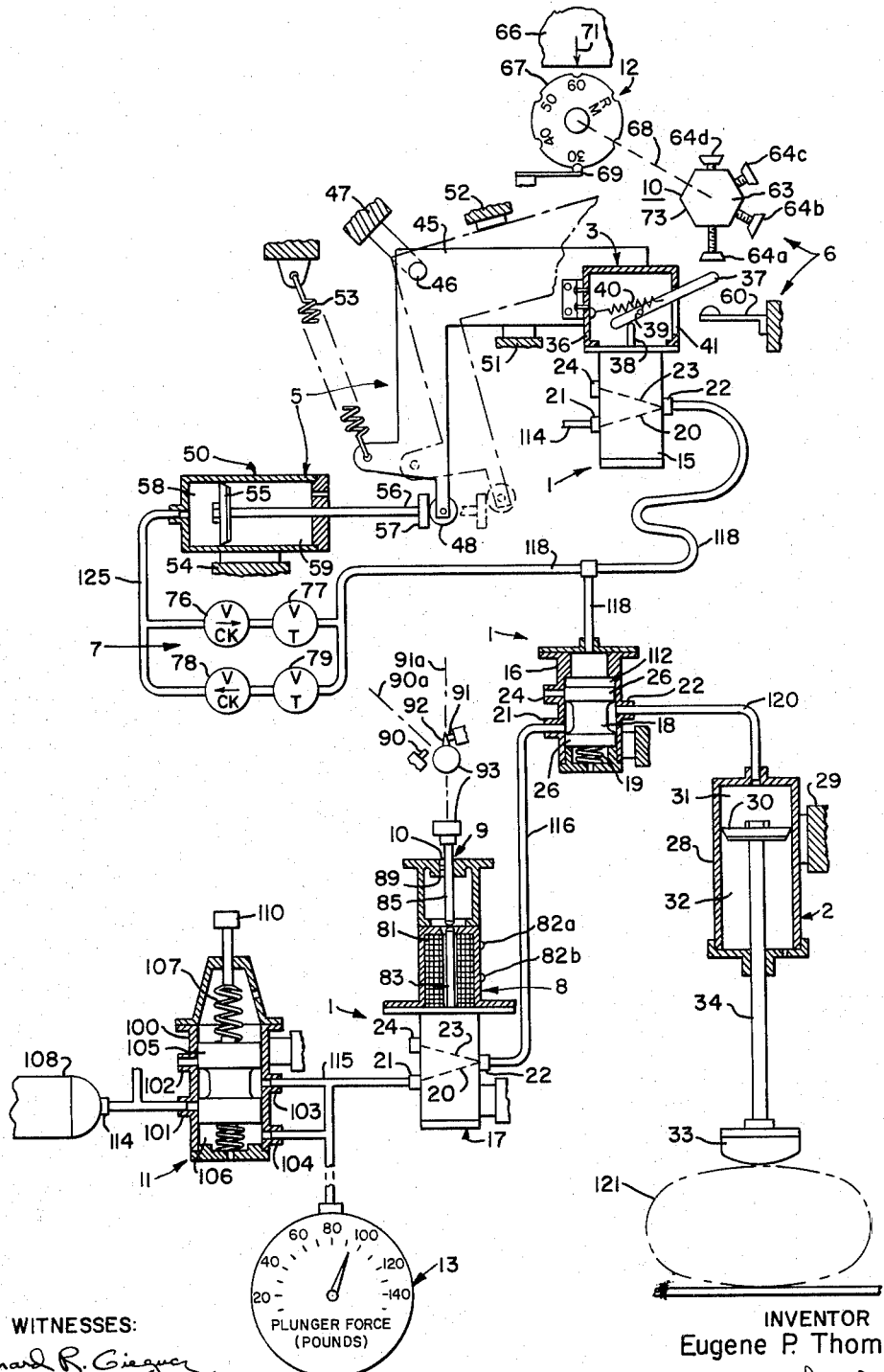

The present invention relates to a heart resuscitator and fluid pressure control apparatus for controlling intermittent supply and release of fluid under pressure to and from a device to be operated reciprocally, and more particularly to such apparatus which includes fluid pressure operated timing valve means for controlling periodic alternate pressurization and depressurization of such as a pneumatic cylinder for heart resuscitation.

Apparatus is available to perform closed-chest heart resuscitation by operation of a pneumatic-cylinder plunger which exerts a rhythmic downward force on the breastbone of a heart arrest victim to alternately compress and release the victim's heart and thereby cause it to pump blood. It has been proposed heretofore to employ, for controlling periodic alternate pressurization and depressurization of the heart compressing cylinder, an apparatus which can be timed pneumatically by use of compressed gas from the same source as that employed to operate the cylinder, rather than relying exclusively upon electrical timing which requires an electrical source in addition to the compressed gas source.

Although pneumatically-timed control valve means are available which are adaptable for use in controlling operation of a heart-compressing cylinder, it is an object of the present invention to provide an improved control valve means of such pneumatically-timed type, which has improved structural and operational characteristics, greater simplicity, flexibility of operational adjustment and economies of construction with an improved degree of reliability.

Other objects and advantages of the invention will become apparent from the following detailed description, taken in connection with the accompanying drawing, in which the single figure is a diagrammatic representation, partly in outline and partly in section, of an illustrative embodiment of the invention as constructed and arranged for controlling operation of a heart-compressing cylinder.

Referring to the drawing, general features of the pneumatically-timed pressure pulsation control apparatus of the present invention include valve means 1 for controlling supply and release of compressed gas to and from the fluid pressure operated heart-compressor cylinder, a snap-acting mechanism 3 operatively associated with the valve means to assure relatively-rapid, positive and trouble-free operation thereof; a pneumatically-operated reciprocable pilot actuating means 5 for operating the snap-acting mechanism 3 and thereby operating the valve means 1; repetition-rate-adjusting means 6 for varying the repetition rate of operation of the snap-acting mechanism by the actuating means 5; supply-release-ratio adjusting means 7 for regulating operation of the actuating means 5 and thereby operation of the snap-acting mechanism 3 and valve means 1 to vary the relationship between the alternate periods of pressurization and depressurization of the cylinder 1; electrically-responsive means 8 for remote electrical control of the valve means 1 as by response to signals synchronized with the patient's R-wave which comes into being upon resumption of a natural heart beat; a manually-operated actuating means 9 for the valve means 1; an operating mode selector means 10 for selecting the mode of control for the valve means 1, i.e., pneumatic-automatic, manual, or electric-remote; a regulating valve means 11 to determine the force created by the heart-compressing cylinder 2; and indicator means 12 and 13 for indicating the beats per minute chosen for automatic-pneumatic cycling, the chosen mode of operation, and the force created by the heart-compressing plunger of the cylinder 2.

In the embodiment of the invention exemplified herein, the valve means 1 comprises three selector valve devices 15, 16 and 17. Selector valve device 15 is operated by the snap-acting mechanism 3; selector valve device 16 has its output port connected to the cylinder 2 and is controlled by valve device 15; and selector valve device 17 controls admission of compressed gas to the supply port of valve device 16 and is operable by the manually-operated actuating means 9 and the electrically-responsive actuating means 8. Each of these devices 15, 16 and 17 comprises such as a spool valve 18 (as shown in device 16) which is actuable against the bias of a spring 19 to a lowermost supply position (in which it is shown in device 16) for establishing a supply communication (dash line 20 in devices 15 and 17) between a supply port 21 and a delivery port 22. Spool valve 18 is urged by the bias spring 19 to an uppermost position for establishing a release communication (dash line 23 in devices 15 and 17) between the delivery port 22 and an exhaust port 24. While one communication 20 or 23 is established, the other communication is disestablished, so that spool valve 18 acts as a selector valve and its lands 26 cover up ports 21 and 24 respectively according to the communication to be disestablished.

The heart-compressing cylinder 2 with which the present invention may be associated, for sake of illustration comprises a cylindrical housing 28 secured to a fixed member 29 for disposition in a vertical attitude and having a piston 30 slidably disposed therein and subject oppositely to a pressure chamber 31 at one side and an atmospheric chamber 32 at its opposite side. The piston 30 is operatively connected to a padded plunger head 33 through medium of a piston rod 34. The plunger head 33 is adapted for engagement with the breastbone of a heart arrest victim to cause compression of the victim's chest and hence compression of the victim's heart in response to pressurization of the chamber 31 and the force created on the piston 30. Reexpansion of the victim's chest upon release of fluid under pressure from the chamber 31 causes return movement of the plunger head 33 and the piston 30 while such plunger head remains in contact with the victim's chest. No piston return spring is employed. This prevents establishment of any clearance between the plunger head 33 and the victim's chest which might result in the delivery of a blow, rather than a smooth compressing force, upon successive pressurizations of the chamber 31.

For sake of illustration, the snap-acting mechanism 3 for operating the selector valve device 15 comprises a housing member 36 enclosing one end of a toggle arm 37 which is operatively associated with a valve stem 38 operatively connected to the spool valve 18 of the device 15. Toggle arm 37 is pivotally connected to the housing 36 at 39 and is biased by a tension spring 40 to one over-center position or the other as defined by engagement of an outwardly projecting portion of the arm 37 with the upper and lower edges of an opening 41 in the housing 36 through which such portion extends. In an upper position of the arm 37 in which it is shown in the drawing, the valve stem 38 is depressed and the respective spool valve 18 is positioned to establish the supply communication 20. In the lowermost position of the projecting portion of the stem 37, the respective spool valve 18 will be up and the release communication 23 will be established.

The reciprocable actuating means 5, for sake of illustration, comprises an L-shaped rockable member 45 which is pivotally connected to a pin 46 carried by fixed member 47. One end of the one leg of the L-shaped member 45 carries the valve device 15 and its snap-acting mechanism 3 while the projecting end of the other leg of such member 45 is adapted through the medium of a roller 48 to be actuated by a cylinder device 50. An angular movement of the member 45 is limited by stops 51 and 52. The tension spring 53 is connected to member 45 in a manner which urges it toward the stop 51, which is in a direction urging roller 48 toward the cylinder device 50. Cylinder device 50 is secured to a fixed member 54 and includes a piston 55 which is operatively associated with the roller 48 of member 45 through the medium of a piston rod having an enlarged end member 57 for abutment with such roller. Piston 55 is exposed at one side to a pressure chamber 58 and to an atmospheric chamber 59 on the piston rod side.

The repetition-rate adjusting means 6 comprises a fixed stop 60 which is engaged by the projecting end of the toggle arm 37 to cause it to flip to the position in which it is shown in the drawing, upon movement of the rockable member 45 in a clockwise direction into engagement with the stop member 51 under influence of the tension spring 53 as piston 55 moves in the direction of pressure chamber 58 upon release of compressed gas therefrom. The means 6 also includes a rotary adjustable member 63 which carries a plurality of adjustable stops, 64a, 64b, 64c, and 64d which may be moved selectively to a position for contact by the projecting end of the toggle arm 37 to cause it to flip to its opposite position for permitting stem 38 to move upwardly to establish communication 23 during movement of the arm 45 in a counterclockwise direction under influence of the piston 55 against opposition of the spring 53. By selecting one or the other of the adjustable stops 64a to 64d, the distance required for travel of the snap-acting mechanism 3 before the toggle arm 37 is tripped to one or the other of its over-center positions may be varied to obtain regulation of the rate at which such toggle arm is snapped back and forth and hence regulation of the repetition rate of alternation between selective establishment of the two communications 20 and 23 in the valve device 15. Visual indication of the selected repetition rate for the different rotary positions of the member 63 is given on an indicator means 12 which comprises a fixed member 66 and a rotatable member 67 which is constructed and arranged to be turned in unison with the member 63 about its axis 68. Selected rotary positions of the member 63 are held by detent means 69 and the repetition rate is indicated by numerals, such as "30," "40," "50" and "60" which are marked on member 67 for reference with an arrow 71 on member 66. In one position of member 63 indicated on member 67 with "R and M," a portion 73 of member 63 which is without any adjustable stop such as 64a to 64d is presented facing the path of travel of the toggle arm 37. In this position of member 63, the rockable member 45 will engage stop 52 before the toggle arm 37 can be tripped from a position in which it is shown in the drawing to its opposite position and hence the respective spool valve 18 of the valve device 15 will remain in its lowermost position to hold the communication 20 established, for reasons which hereinafter will become apparent.

The supply-release ratio adjusting means 7 comprises two pairs of series-connected check valves and throttle valves 76 and 77 and 78 and 79 constructed and arranged to regulate independently the rate of supply and release of compressed gas to the pressure chamber 58 in the cylinder device 50 to determine the ratio between the time that the plunger head 33 of the heart-compressing cylinder 2 is urged downwardly relative to the time that the downward force is relieved on such plunger head, for reasons which hereinafter will be explained.

The electrically-responsive actuating means 8 is in the form of a solenoid 81 which is energizable by way of terminals 82a and 82b to cause downward movement of a stem 83 connected to the respective spool valve 18 of the valve device 17 for establishment of the communication 20, and which solenoid when deenergized permits the respective spring 19 in the valve device 17 to return the respective spool valve 18 upwardly to establish the communication 23 while disestablishing the communication 20.

The manually-operated actuating means 9 is in the form of a push rod 85 which is depressible downwardly to cause actuation of the stem 83 and thereby the respective spool valve of the valve device 17 to selectively establish the communication 20 and which will return upwardly upon release of manual effort to the position in which it is shown in the drawing to permit the respective spring 19 of the valve device 17 to return the spool valve to the position in which the communication 23 is selectively established. The push rod 85 may be locked in its lowermost position by what is herein referred to as an operating mode selector means 10 which, in the illustrative embodiment is constituted by a tab secured to the push rod 85 which is slidable in a groove to a lowermost position in which such tab may be rotated to a locked position in engagement with an annular stop surface 89. The different rotary positions, corresponding to the different vertical positions, of the push rod 85 may be defined by fixed rotarywise stops 90 and 91 engageable by an indicator tab 92 carried by a handle 93 secured to the top of the push rod.

The regulating valve means 11, for sake of illustration comprises a housing 100 having supply, exhaust, delivery, and control ports 101, 102, 103, and 104 therein, and a piston valve 105 which is subject opposingly to pressure of fluid in the control chamber 106 and to the force of an adjustable spring 107 to regulate the pressure of compressed gas appearing in the delivery port 103 by control of supply of compressed gas from a source 108 via the port 101 and the release of compressed gas via the exhaust port 102, in the well known manner. Adjustment of the bias imposed by the spring 107 on the piston valve 105, and hence regulation of the discharge pressure from the regulating valve device 11 may be accomplished by an adjusting screw 110 which has a rotary spring seat for the spring 107 at its lowermost end.

For indicating the force which will be created by the heart-compressing cylinder 2 available for exertion by the plunger head 33 on the patient's chest, the means 13 is in the form of a pressure gauge calibrated in terms of pounds of plunger head force.

In the valve device 16, since this valve acts as a relay valve, the spool valve 18 takes the form of a piston valve which is subject opposingly to gas pressure in a pressure chamber 112 to shift the valve 18 against the bias of spring 19, and no valve stem as in the valve devices 15 and 17 is required.

*Operation*

In operation of the control apparatus of the present invention, assume that the supply port 101 of the regulating valve device 11 is connected to a source of compressed gas 108 via a conduit 114; that the supply port 21 of the valve device 15 is also connected to such source of compressed gas by way of a branch of the supply conduit 114; that the plunger 85 affiliated with the valve device 17 is locked in its lowermost position for automatic-pneumatic control of cycling of the heart-compressor cylinder device 2, in which case the communication 20 of valve device 17 is established for connecting the delivery pressure from the regulating valve device 11 to the supply port 21 of the valve device 16 by way of conduits 115 and 116; that the valve device 15 is in the position in which it is shown in the drawing establishing its communication 20 in which supply pressure is availed from the source of compressed gas 108 via conduit 114 to the pressure chamber 112 of the valve device 16 by way of a conduit 118; that therefore the spool valve 18 of valve device 16 is in the lowermost position in which it is shown in the drawing establishing communication between the conduit 116 and the pressure chamber 31 of the heart-compressing cylinder device 2 by way of the respective communication 20 of valve device 16 and a conduit 120; that therefore the chamber 31 in the heart-compressing cylinder device 2 is pressurized and acting against the piston 30 to cause the plunger head 33 to be moving downward for compressing the chest of a heart-arrest victim 121 indicated symbolically by the dot-and-dash outline in the drawing; that the force exerted by the plunger head 33 against the chest of the patient 121 has been chosen as desired compatible with the size, weight, and age of the patient in assist by indication from the means 13; that the repetition rate for pulsing operation of the heart-compressing cylinder 2 has been chosen at such as 60 beats per minute as indicated on rotary member 67; that the adjustable member 63 is positioned to bring the stop 64a into presence of the path of travel of the projecting end of the toggle arm 37; that compressed gas supplied to the relay valve device 16 by way of the conduit 118 is flowing at a rate controlled by the throttle valve 79 to the pressure chamber 58 of the cylinder device 50 via the check valve 78 and the conduit 125; that therefore the piston 55 is moving in the direction of atmospheric chamber 59 and causing the piston rod 56 to be moving the arm member 45 in a counterclockwise direction about the pin 46 while carrying the snap-acting mechanism 3 and the valve device 15 with it.

During such movement of the snap-acting mechanism 3 in unison with the member 45 about the pin 46 the projecting end of the toggle arm 37 will contact the projecting end of the adjustable stop 64a and cause the toggle arm 37 to rock clockwise about the pin 39 until it flips under influence of the tension spring 40 to its opposite over-center position in which the respective spring 19 of the valve device 15 moves the respective spool valve 18 upwardly to selectively establish its communication 23 to connect the conduit 118 to the atmosphere by way of the exhaust port 24. Compressed gas in the control chamber 112 of the relay valve device 16 will then release rapidly to the atmosphere by way of the conduit 118 and the communication 23 in the valve device 15 to permit the relay valve device 16 to rapidly vent the pressure chamber 31 in the heart-compressing cylinder device 2 to the atmosphere by way of the exhaust 24 in such device 16, whereupon the resiliency of the patient's chest causes an upward force on the plunger head 33 which returns the piston 30 upwardly to the position in which it is shown in the drawing. At the same time, compressed gas in the pressure chamber 58 of the cylinder device 50 of the actuating means 5 will flow, via the conduit 125 and the check valve 76 at a controlled rate determined by the throttle valve 77, to the vented conduit 118. Such release of compressed gas from the pressure chamber 58 permits the tension spring 53 to rock the member 45 in a clockwise direction about the pin 46 and carry the snap-acting mechanism 3 downwardly, as viewed in the drawing, and bring the projecting end of the tobble arm 37 into engagement with the fixed stop 60 which will cause such toggle arm to flip to the upward position in which it is shown in the drawing for again depressing the plunger 38 and causing establishment of the supply communication 20 in the valve device 15 for effecting resupply of compressed gas to the pressure chamber 31 in the heart-compressing cylinder device 2 and downward movement of the plunger head 33 for recompression of the victim's chest in the manner as previously described.

In accord with a feature of the invention, the rate at which the snap-acting mechanism 3 is alternately operated is dependent upon the distance between the fixed stop 60 and the projecting end of adjustable stops 64a, 64b, 64c or 65d. When this distance is shortest as by effectuation of stop 64a, the repetition rate is greatest, or at such as the exemplified 60 beats per minute, and when the distance is greatest as by effectuation of stop 64d, the repetition rate will be slowest, such as 30 beats per minute as exemplified herein. The repetition rate for pulsing operation of the heart-compressing cylinder device 2 can also be influenced by the adjustment of the throttle valves 77 and 79, but it is not intended that they necessarily function in this manner except as may be necessary to obtain correlation with the indicated rate appearing on the rotary member 67. It is intended rather that, for a given selected repetition rate, the throttle valves 77 and 79 will adjust the relative rates of movement of the snap-acting mechanism in its opposite direction to obtain regulation of the ratio between the time that the heart-compressing cylinder device 2 is pressurized relative to the time that it is depressurized, for a given cycle of its operation. For example, for two-thirds of the period of each cycle the cylinder device 2 may be pressurized, while the remaining one-third of the cycle it may be depressurized. Opinion as to which relationship is preferred may change from time to time as more experience is gained with the use of the technique of closed chest heart resuscitation. It will also be appreciated, that once having established the ratio between pressurization and depressurization of the heart-compressing cylinder device 2 by adjustment of the two throttle valves 77 and 79, the rate as indicated on member 67 may be brought into being by adjustment of the stops 64a, 64b, 64c, and 64d which have screw-threaded portions affording their being effectively shortened or lengthened relative to the member 63 as desired to vary the travel distance of the required flip-over travel distance of the toggle arm 37.

When it is desired to control operation of the heart-compressing cylinder device 2 either manually or remotely by electrical R-wave control, the adjustable member 63 of the means 6 is rotated to a position indicated on member 67 as "R and M" position in which the surface 73 is presented to the path of travel of the toggle arm 37 and the various stops 64a to 64d are rendered ineffectual. In this position, the piston 55 of cylinder device 50 will move the rockable member 45 into engagement with the stop 52 which defines a position of the toggle arm 37 such that it either does not contact the surface 73 of member 63 or is not rocked sufficiently relative to the pin 39 to flip to its opposite over-center position. Such toggle arm then remains in the position in which it is shown in the drawing with the communication 20 of valve device 15 remaining established and hence the pressure chamber 112 of the relay valve device 16 remaining pressurized to hold the supply communications 20 of such valve device established and maintaining the supply port 21 connected to the delivery port 22. Under these conditions, pressurization and depressurization of the pressure chamber 31 of the heart-compressing cylinder device 2 is dependent upon the position of the valve device 17 which can be caused to selectively establish either its release communication 23 or its supply communication 20 according to energization and deenergization of the solenoid 81 via the terminals 82a and 82b, as in external R-wave control, or by depression and release of the operating stem 85 manually. In the uppermost position of stem 85, the respective release communication 23 will be established in the valve device 17, so that compressed gas will be released from the chamber 31 in cylinder device 2 by way of the conduit 120, the communication 20 in the relay valve device 16, the conduit 116 and said communication 23 in device 17. When the plunger 85 is depressed manually, the supply communication 20 of the valve device 17 permits compressed gas at the discharge port 103 of the regulating valve device 11 to flow via such communication 20, the conduit 116, the valve device 16 and the conduit 120, to the pressure chamber 30 of cylinder device 2 and cause actuation of the plunger head 33 for depression of the victim's chest and compression of the victim's heart at a rate which is determined by the rate of manual depression and release of the stem 85 affiliated with the device 17.

The source of compressed gas for operating both the cylinder device 2 and the automatic pneumatic control apparatus of the present invention can be such as an oxygen line or compressed air line which may be found in various rooms of a hospital, or it can be a bottle of carbon dioxide, a bottle of oxygen, or other suitable compressed gas.

From the foregoing, it will be apparent that the pressure control apparatus of the present invention is particularly suited for operation of a heart-compressing cylinder device and among its desirable features is included a means for effecting manual control of the pulsing operation of such a cylinder device, a means for effecting a remote R-wave control of such cylinder device, as well as a means for obtaining automatic pneumatic control of pulsing operation of such cylinder device, which latter means provides for selection of a repetition rate of such operation of the cylinder device as well as for adjustment of the ratio between the heart-compressing stroke relative to the release stroke of such cylinder device. Furthermore, by employment of a snap-acting mechanism for controlling the supply and release of compressed gas to and from the heart-compressing cylinder device, positive pressure pulses are established in such cylinder device and such control is maintained in operation reliably and with assurance. Furthermore, it will be noted that in the event that supply pressure should become dissipated and/or one or another of the several supply and release conduits become vented to the atmosphere, as during accidental separation or leakage, that the pressure chamber in heart-compressing cylinder device will become vented to permit the plunger head 33 to relax exertion of any effort against the chest of the patient. For example, with the plunger 85 of the valve device 17 locked in its lowermost position with communication 20 established, if the supply pressure should fail, then the chamber 31 will be vented via the conduit 120, the spool valve 18 in its lowermost position, the conduit 116, and such communication 20 in valve device 17. If, on the other hand, conduit 118 should become vented, then the spool valve 18 of valve device 16 will move upwardly to cause the chamber 31 to vent by way of the conduit 120 and the exhaust port 24 of such relay device 16.

Wherein such terms as "pneumatic" or "pneumatically" are used herein, it is intended that they be interpreted in their broader sense as relating to a compressible fluid, gases such as carbon dioxide, oxygen etc., in addition to air.

While the invention has been described with a degree of particularity, it is not intended that it necessarily be so limited, except as lies within the scope of the appended claims.

Having now described the invention, I claim:

1. Heart resuscitator apparatus comprising a plunger head for chest-compressing engagement with the breastbone of a heart arrest victim, a pneumatically-operated chest-compressing actuator operatively connected to said plunger head, valve means for controlling supply and release of compressed gas to and from said chest-compressing actuator, a snap-acting means for operating the valve means to assure rapid and positive operation thereof, pneumatically-operated reciprocable pilot actuating means for operating the snap-acting means and thereby operating said valve means, said pilot actuating means being pressurized and depressurized by pneumatic feedback from said valve means, repetition-rate-adjusting means for varying the repetition rate of operation of said snap-acting means by said actuating means, separately-adjustable supply and release adjusting means for regulating operation of said actuating means to vary the periods of pressurization and depressurization of said chest-compressing actuator, respectively, for a given reciprocation cycle thereof, adjustable regulating valve means constructed and arranged to regulate pressure of fluid admitted to said chest-compressing actuator without affecting pressure of fluid admitted to said pilot actuating means and thereby regulate the potential force available at the plunger head, and means for indicating to an operator the degree of such potential force.

2. Apparatus as set forth in claim 1, wherein the first-named valve means includes three selector valve devices, a first valve device, a second valve device, and a third valve device, each valve device having a delivery port, a supply port, and an exhaust port and being actuable alternately to selectively establish a supply communication between its delivery port and its supply port or a release communication between its delivery port and its exhaust port which is open to the atmosphere in each device; wherein said first valve device is actuable for an automatic-pneumatic cycling mode of operation of the apparatus by said snap-acting means in a manner of effectuation which also permits the supply communication of said first valve device to be maintained established for accord with a manual-mode of control of operation of the apparatus, the supply port thereof is adapted to be connected to a source of compressed gas, and the delivery port thereof is in pneumatic communication with said reciprocable pilot actuating means; wherein said second valve device is in form of a relay valve device having a control port in pneumatic communication with the delivery port of said first valve device and actuated in response to pressurization of its control port via said first valve device to establish its supply communication and to depressurization of its control port via said first valve device to establish its release communication; and wherein said third valve device is actuable manually in a manner of effectuation which permits the supply communication of such third valve device to be maintained established for accord with control of operation of the apparatus by automatic alternation of the first valve device for effecting the automatic-pneumatic cycling mode, the delivery port thereof is pneumatically connected to the supply port of said second valve device, and the supply port thereof is available for receipt of compressed gas from the source thereof.

3. Apparatus as set forth in claim 2, wherein the aforesaid supply and release adjusting means is in form of two adjustable throttling means in the communication between the delivery port of said first valve device and said pneumatically-operated reciprocable pilot actuating means, and check valve means directing flow of compressed gas through the two throttling means respective to direction of flow.

4. Apparatus as set forth in claim 1, wherein said snap-acting means includes a spring-biased toggle arm and said pneumatically-operated reciprocable pilot actuating means comprises a pair of spaced-apart abutment means for oppositely engaging said toggle arm to trip it from one position to the other, and a spring-returned piston-operated member to cause relative movement between said abutment means and said toggle arm.

5. Apparatus as set forth in claim 4, wherein the aforesaid repetition-rate-adjusting means includes said pair of spaced-apart abutment means and the latter are adjustable relative one-to-the-other to vary the degree of such relative movement required to cause tripping of said toggle arm.

6. Apparatus as set forth in claim 4, wherein said piston-operated member is of limited maximum travel and said spaced-apart pair of abutment means are so adjustable as to avoid tripping of said toggle arm during movement of said member up to its maximum travel position, to ineffectuate the automatic-pneumatic cycling control of pressurization of the chest-compressing actuator and permit said valve means to be manually controlled.

References Cited by the Examiner

UNITED STATES PATENTS

| | | | |
|---|---|---|---|
| 1,549,206 | 8/25 | Miller | 137—624.14 |
| 2,071,215 | 2/37 | Petersen | 128—28 |
| 2,577,981 | 12/51 | Stacy | 91—6 X |
| 2,690,174 | 9/54 | Fuchs | 128—44 |
| 2,830,580 | 4/58 | Saklad et al. | 128—29 |
| 2,870,763 | 1/59 | Stanton | 128—29 |

RICHARD A. GAUDET, *Primary Examiner.*